United States Patent
Chada et al.

(10) Patent No.: US 10,560,290 B2
(45) Date of Patent: Feb. 11, 2020

(54) INFORMATION HANDLING SYSTEM HALF UNIT INTERVAL EQUALIZATION

(71) Applicant: Dell Products L.P., Round Rock, TX (US)

(72) Inventors: Arun R. Chada, Round Rock, TX (US); Han Deng, Round Rock, TX (US); Bhyrav M. Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 15/864,438

(22) Filed: Jan. 8, 2018

(65) Prior Publication Data
US 2019/0215196 A1  Jul. 11, 2019

(51) Int. Cl.
*G06F 13/38* (2006.01)
*H04L 25/03* (2006.01)
*G06F 13/42* (2006.01)
*G06F 13/40* (2006.01)

(52) U.S. Cl.
CPC .... *H04L 25/03095* (2013.01); *G06F 13/4072* (2013.01); *G06F 13/4291* (2013.01); *G06F 2213/0026* (2013.01); *G06F 2213/0032* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,944,963 | B2* | 5/2011 | Cases | H04L 1/205 375/147 |
| 9,143,369 | B2* | 9/2015 | He | H04L 25/03343 |
| 9,438,350 | B1* | 9/2016 | Schmidt | H04B 10/5057 |
| 9,553,635 | B1* | 1/2017 | Sejpal | H04B 3/54 |
| 9,935,682 | B1* | 4/2018 | Chada | H04L 25/03121 |
| 9,954,576 | B2* | 4/2018 | Chada | H04B 3/04 |
| 10,073,750 | B2* | 9/2018 | Pickerd | G06F 11/30 |

* cited by examiner

*Primary Examiner* — Cheng Yuan Tseng
(74) *Attorney, Agent, or Firm* — Zagorin Cave LLP; Robert W. Holland (57) ABSTRACT

An information handling system communicates information across a physical link with high and low signal values sent at a unit interval. Feed forward equalization improves signal transfer with pre-emphasis of low-to-high signals and de-emphasis of high-to-low signals lasting for a fraction of the unit interval, such as one-half or one-quarter of the unit interval. Fractional unit interval pre-emphasis and de-emphasis reduce inter symbol interference to improve frequency domain eye structure at the physical link receiver.

16 Claims, 6 Drawing Sheets

CONVENTIONAL FFE
EYE WIDTH: 30.61%
EYE HEIGHT: 15.2%

FIG. 8B

PROPOSED INVENTION:
EYE WIDTH: 47.1%
EYE HEIGHT: 15.58%

INFORMATION HANDLING SYSTEM HALF UNIT INTERVAL EQUALIZATION

BACKGROUND OF THE INVENTION

Field of the Invention

The present invention relates in general to the field of information handling system communication links, and more particularly to an information handling system half unit interval equalization.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information by communicating the information between memory locations and processing resources, such as at a physical link level between processing components and at a network level between systems. A variety of communication protocols exist to communicate information through physical lines at high data rates, such as in excess of a 32 Gbps. For example, PCI Express links communicate information between physical processing components at gigabit rates and Ethernet communicates information between networking components at gigabit rates. Despite these rapid data rates, communication of information often presents a bottleneck in processing systems as processors lose cycles waiting for information to arrive for processing. Thus, industry continues to look for communication protocols and physical hardware that will achieve greater data transfer rates.

Figure 1:
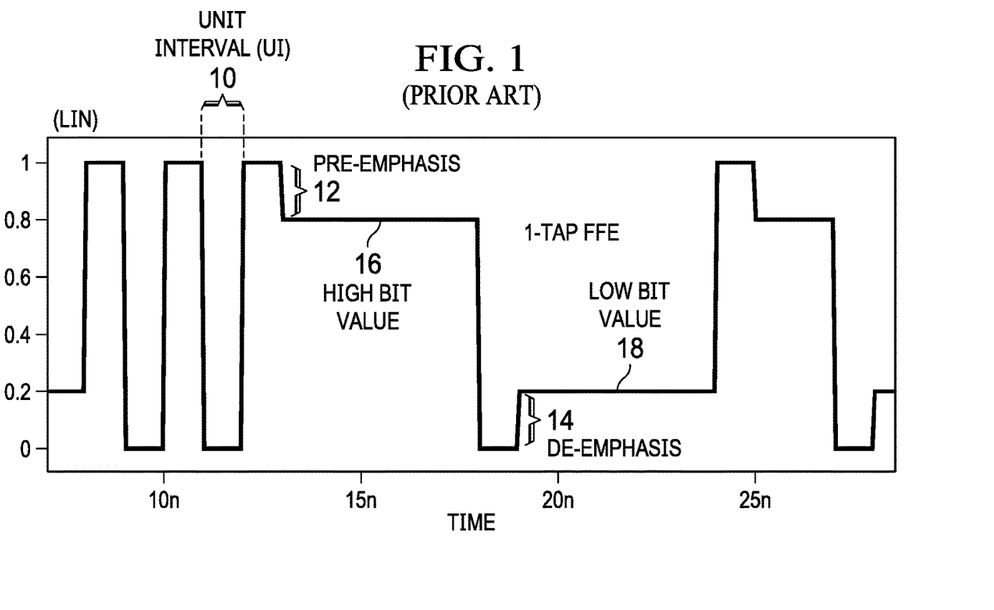
FIG. 1 depicts a time waveform representation of a prior art Feed Forward Equalization FFE using a single unit interval delay tap FIR filter structure.
Figure 2A:
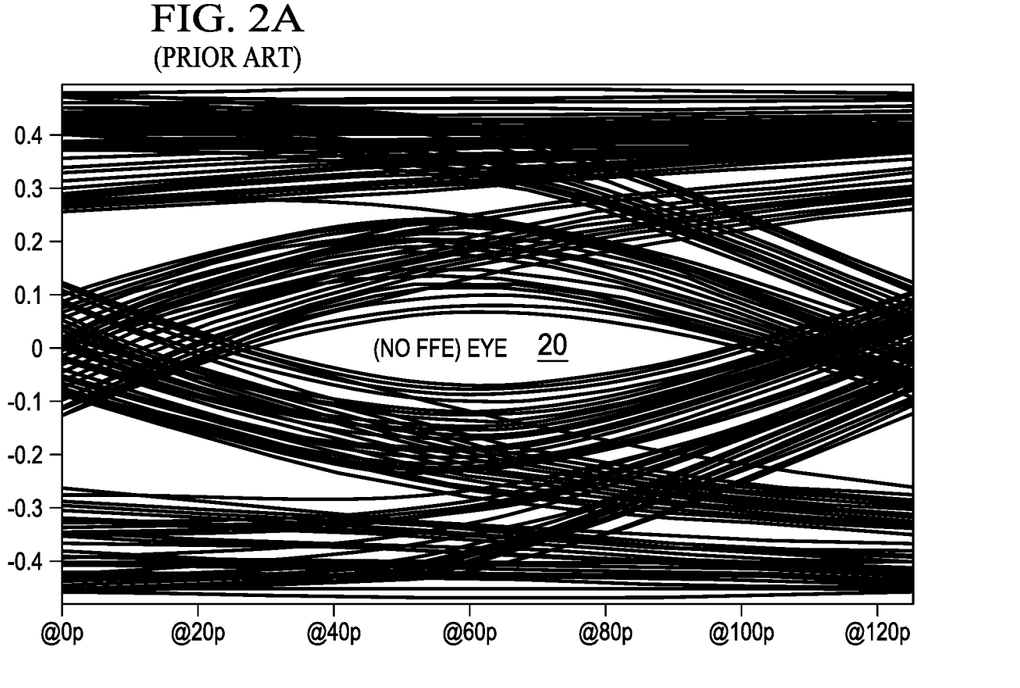
FIGS. 2A and 2B depict eye opening improvement in the frequency domain with and without FFE.
Figure 2B:
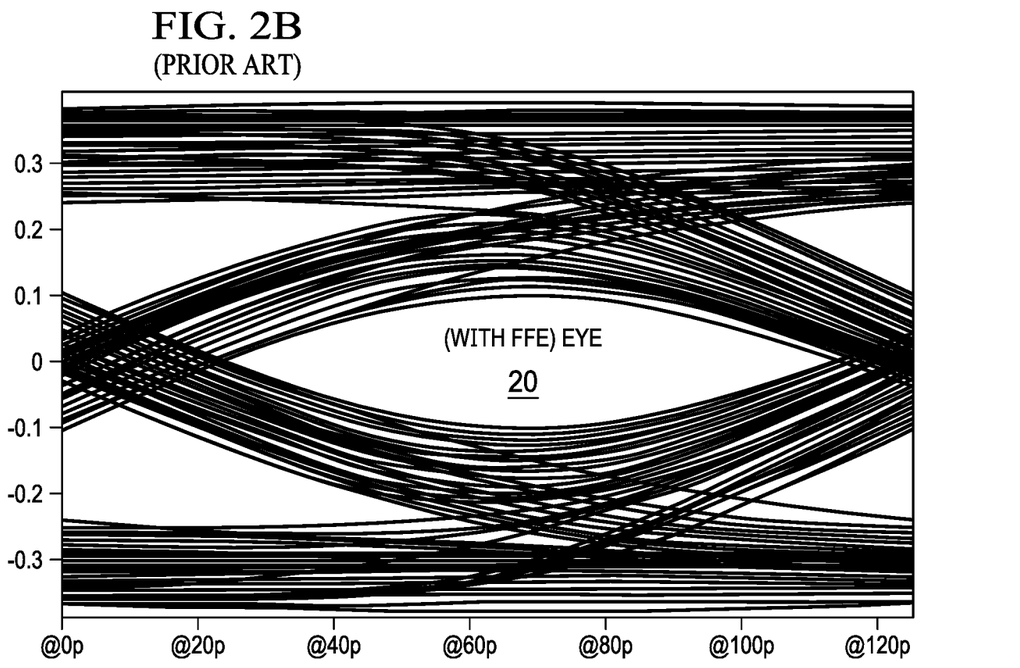

Essentially data transfer involves sending a series of timed pulses across a wire with a voltage value for binary one and a voltage value for binary zero. Often communication signals fall to noise level by the time the signals reach a receiver. A variety of techniques exist to help pick data from noise, such as continuous time linear equalization (CTLE), which attempts to amplify the signal for better reception. Such approaches are broadband in nature trying to associate frequency domain poles and zeros to the operating frequency. Another technique is decision feedback equalization (DFE), which uses a non-linear feedback loop based on receiver latch decision making. CTLE and DFE relate to processing at a receiver to improve signal reception. Another technique that focuses on both improved signal transmission and reception is feed forward equalization (FFE). FFE at a transmitter applies pre-emphasis or de-emphasis to the signal to help overcome inter symbol interference (ISI). FIG. 1 depicts an example of FFE that applies a single unit interval (UI) 10 delay tap with pre-emphasis 12 at a high signal and de-emphasis 14 at a low signal. FFE removes pre-emphasis 12 after a full UI at the high value so that the high bit value 16 is sent until a low bit value 14 is called for. At transition from high bit value 16 to low bit value 14, the de-emphasis 14 is held for a single UI and then low bit value 18 is sent until another transition from the low to the high bit value introduces another pre-emphasis for a single UI. FIG. 2A depicts a frequency domain "eye" that results with no FFE applied and FIG. 2B shows the "eye" with FFE applied as shown in FIG. 1. Conventional FFE schemes use a single UI delay tap finite impulse response (FIR) filter structure that provides improved signal detection at a receiver. The improved signal is shown in the frequency domain by the increased eye height and width of FIG. 2B compared with FIG. 2A. Nonetheless, as data rates increase over 10 Gbps ISI pulse response tends to spread across and interfere with other unit intervals of the signal, effectively closing the frequency domain eye and decreasing signal strength distinguishable at the receiver.

SUMMARY OF THE INVENTION

Therefore, a need has arisen for a system and method which improves signal transfer strength at high frequency physical interfaces.

In accordance with the present invention, a system and method are provided which substantially reduce the disadvantages and problems associated with previous methods and systems to communicate high frequency signals across a physical medium. Fractional unit interval equalization is applied as a transfer function to improve eye width and height at frequencies below the Nyquist frequency for better receiver detection.

More specifically, an information handling system includes a variety of high frequency signal transfer physical links to communicate information between physical components, such as printed circuit board or cabled PCIe, memory. USB, Ethernet, and/or SATA links. Information is transferred with transitions between high and low bit values performed at a unit interval, such as defined by a clock. A Feed Forward Equalization module interfaces with link transmitters and receivers to define pre-emphasis and de-emphasis associated with signal transitions so that one-half of a unit interval delay is applied. An eye utility monitors eye characteristics that result from the fractional UI compensation and adjust the fraction of the UI that is applied for pre-emphasis and de-emphasis.

The present invention provides a number of important technical advantages. One example of an important technical advantage is that eye width and height characteristics associated with a high frequency communication channel provide a 30 to 50% improved margin for a given transfer speed. The improved eye margin supports improved signal detection at a channel receiver for better channel length and improved channel response in lossy and jittery environments. A fractional UI equalization transfer function is readily enabled through clock skewing and without hardware implementation changes so that feedback based upon detected channel conditions results in real time transfer function adjustments for optimal channel performance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system transfers information across a physical link with one-half or other fractional unit interval Feed Forward Equalization (FFE) to improve signal strength, such as the size of the frequency domain eye. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
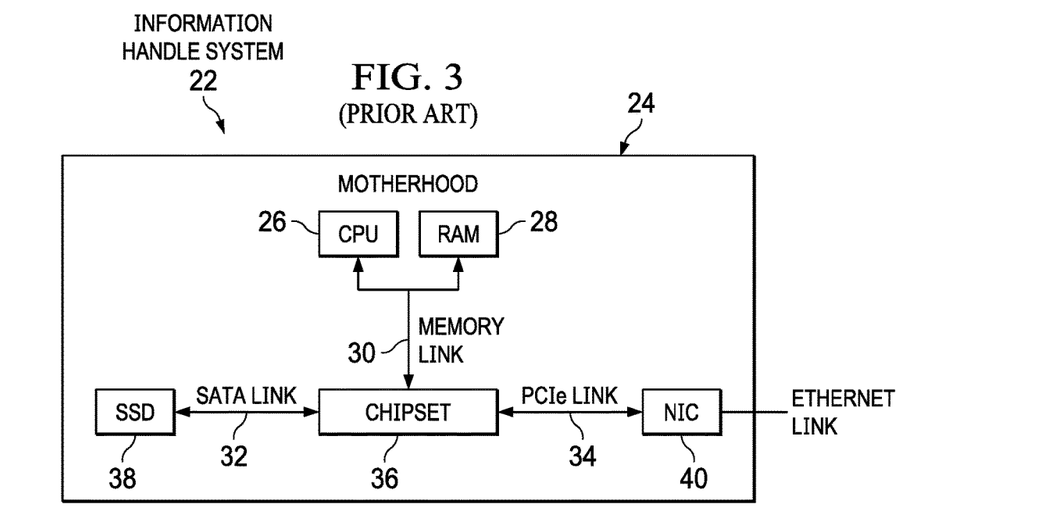
FIG. 3 depicts a block diagram of an information handling system having physical links that communicate information.

Referring now to FIG. 3, a block diagram depicts an information handling system 22 having physical links that communicate information. In the example embodiment, a motherboard 24 integrates wirelines in a printed circuit board that communicate signals between processing components. For example, one or more central processing units 26 couple to motherboard 24, such as through a socket, and communicate with random access memory (RAM) 28 through a memory link 30 integrated in motherboard 24. A chipset 36 integrates with motherboard 24 and includes controllers and embedded code that manages memory transfers, such with a control link to CPU 26 and memory 28. A persistent storage device, such as a solid state storage drive 38 communicates information through a Serial ATA (SATA) link 32 managed by a controller within chipset 36, to provide persistent storage of information during power down periods. In various embodiments, other types of communication links and memory devices may be used. The example embodiment includes a network interface card (NIC) 40 that communicates with chipset 36 and CPU 26 through a peripheral component interconnect express (PCIe) link 34 for supporting external interfaces with an Ethernet link. Information handling system 22 communicates information through the example communication links to perform processing tasks, such as modifying information stored in persistent memory with instructions stored in random access memory and executed by CPU 26. In alternative embodiments, other types of communication links may be used as described below.

Figure 4:
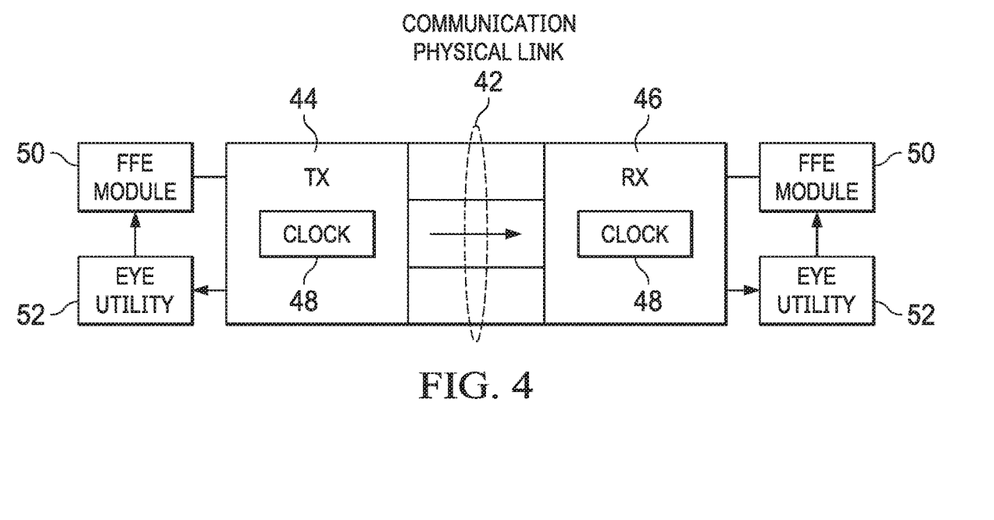
FIG. 4 depicts a block diagram of a physical link that provides one-half UI FFE and eye optimization.

Referring now to FIG. 4, a block diagram depicts a physical link that provides one-half UI FFE and eye optimization. In the example embodiment, a physical communication link 42 sends information as opposite signals across a wire differential pair of conductors, such as through a printed circuit board or cable. A transmitter 44 generates the opposing signals based upon a clock 48 signal to send the opposing signals as timed high and low pulses. A receiver 46 references clock 48 to read the pulses as the signals come across with the opposite polarization by looking for a difference between the pulse values. The amount of difference between each differential signal is shown in the frequency domain by the eye height and width. An FFE module interfaced with transmitter 44 and receiver 46 provides improved eye characteristics, such as greater height and width, by skewing the timing offset for the pre-emphasis and de-emphasis to apply at a fractional value of the unit interval. That is, pre-emphasis is applied at a transition from low-to-high signal on a physical link and is then removed before the full UI delay has passed. Similarly, de-emphasis is applied at a transition from a high to a low signal on a physical link and is then removed before the full UI delay has passed. In one embodiment, clock skew provides pre-emphasis and de-emphasis that lasts one-half of a UI. In alternative embodiments, other fractional portions of the UI may be applied, such as one-quarter UI or one-eighth UI. Under operating conditions, the amount of clock skew that will provide optimal signal transfer may vary based upon noise, reflections, impedance and other conditions present at the physical link. An eye utility 52 associated with the transmitter 44 and receiver 46 monitors eye conditions, such as height and width, to modify the fractional UI applied to pre-emphasis and de-emphasis. For example, as signaling conditions change across physical link 42, slight changes to the timing skew applied to pre-emphasis and/or de-emphasis compared against eye height and width detected by eye utility 52 to find an optimal skew.

Figure 5:
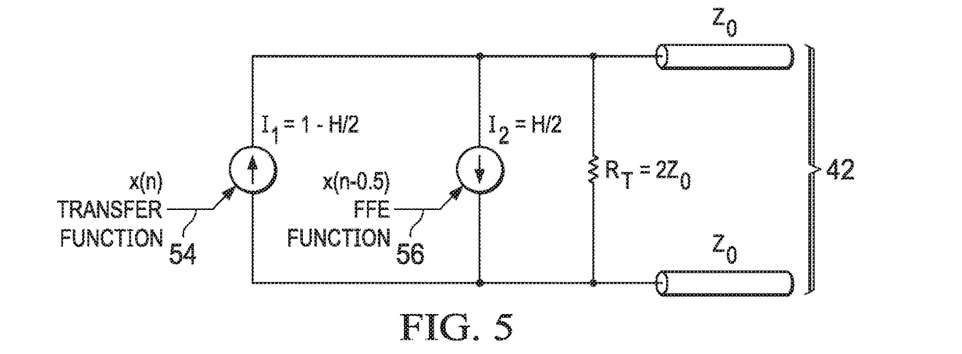
FIG. 5 depicts a circuit block diagram of an implementation having FFE with one-half UI transfer function.

Referring now to FIG. 5, a circuit block diagram depicts an implementation having FFE with one-half UI transfer function. A transmitter generates signals for differential pair of signal conductors 42 with a transfer function 54 that defines pulses transmitted across differential conductor pair 42. An FFE function 56 adapts the pulses to include pre-emphasis and de-emphasis with a one-half unit interval delay. The example physical circuit illustrates an implementation through a software based compensation of timing for signals sent from a transmitter integrated circuit, such as by skewing the time offset in silicon.

Figure 6:
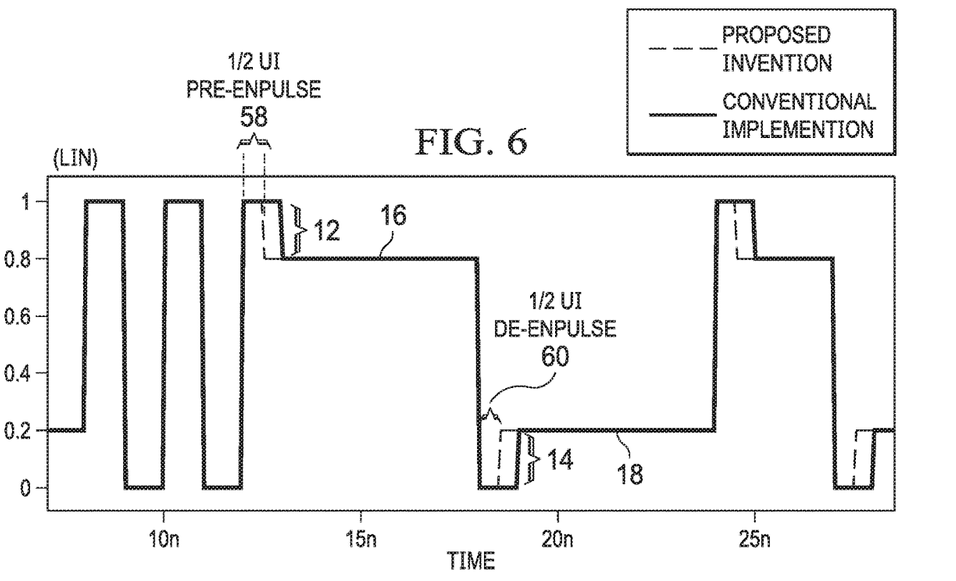
FIG. 6 depicts a time waveform representation of a one-half UI FFE communication signal.

Referring now to FIG. 6, a time waveform representation of a one-half UI FFE communication signal is depicted, such as the waveform generated by the transfer function 54 and FFE function 56 depicted in FIG. 5. The conventional FFE time domain signal illustrated in FIG. 1 is shown with a one-half UI pre-emphasis 58 implemented after a low-to-high signal transition, and a one-half UI de-emphasis 60 implemented after a high-to-low transition. Shortening the delay that is applied for the de-emphasis and pre-emphasis to last one-half UI instead of a full UI improves eye characteristics of signals sent through the physical link. In the example embodiment, the high, low, pre-emphasis and de-emphasis signals are depicted as square waves where pre-emphasis and de-emphasis are applied only when multiple high and low bits follow each other in sequence. In alternative embodiments, as set forth above, the fraction of UI applied for pre-emphasis and de-emphasis may change to provide better eye characteristics, such as a fraction of less than one UI or fractions that relate to frequency characteristics, such as five-eighths or one-quarter of a UI. Other implementations may include ramping de-emphasis or pre-emphasis to a steady state high or low bit value, both within a single UI delay or across multiple UI delays. In one alternative embodiment, the fractional UI delay may be applied within single bit high and low transitions. Both the transmitter and receiver of the physical link may apply the fractional UI delay to enhance eye characteristics to offset channel interference related to ISI and reflectance.

Figure 7A:
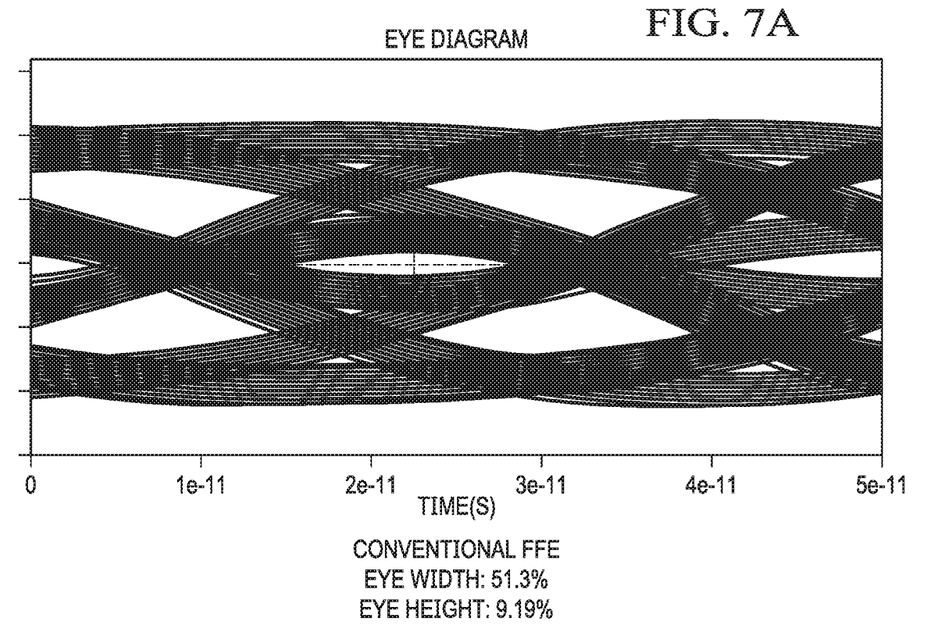
FIGS. 7A and 7B depict an example eye diagram of improvement provided by one-half UI FFE with a lossy test case.
Figure 7B:
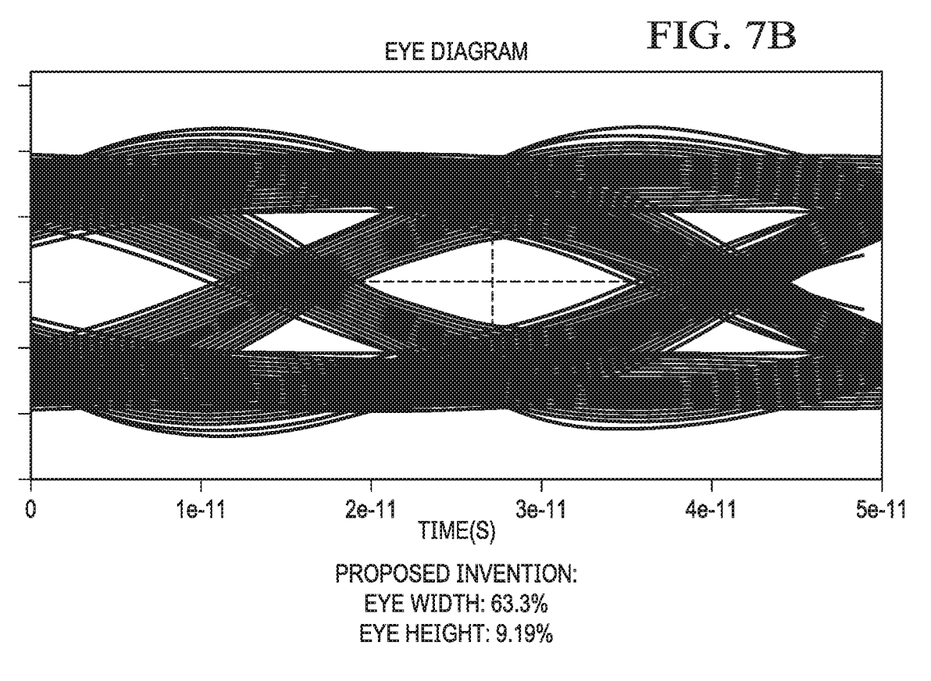
Figure 8A:
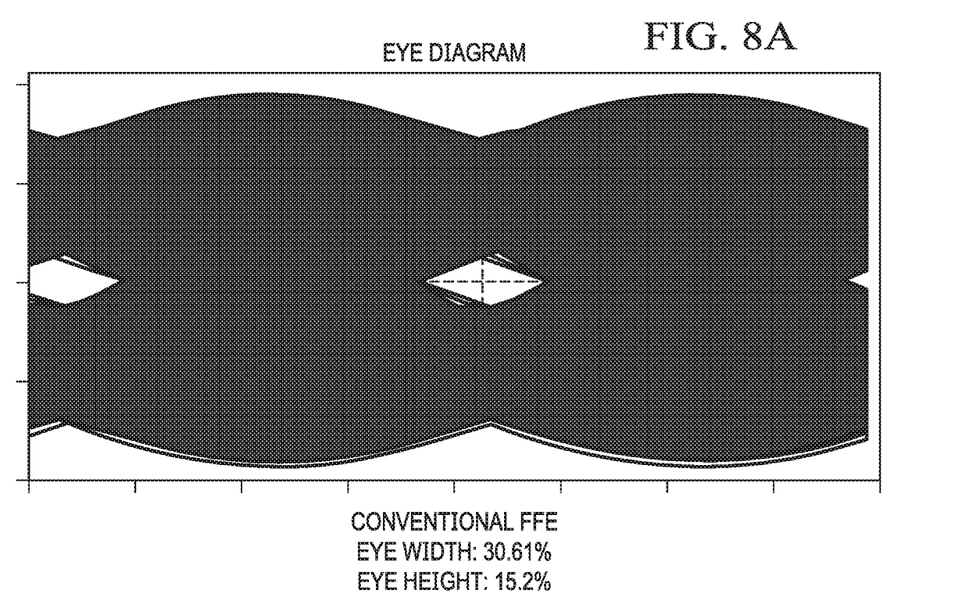
FIGS. 8A and 8B depict an example eye diagram of improvement provided by a one-half UI FFE with a jitter loaded test case.
Figure 8B:
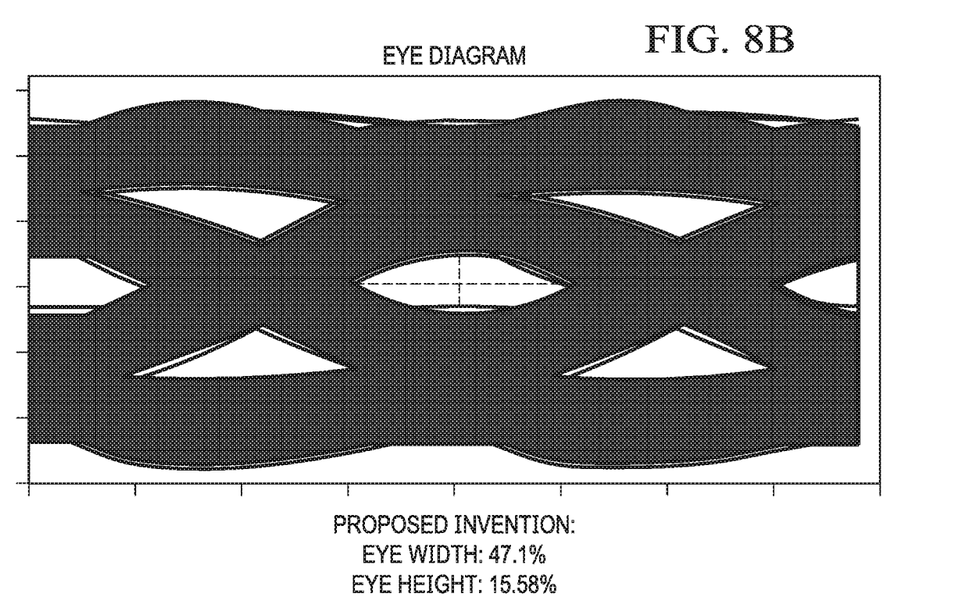

Referring now to FIGS. 7A and 7B, an example eye diagram depicts improvement provided by one-half UI FFE with a lossy test case. In the example, a 50 Gbps channel having a loss dominant characteristic provides an improvement from 51.3% eye width to 63.3% eye width and 9.19% eye height to 34.3% eye height where a one-half UI FFE transfer function is used. The improved eye characteristics is due to the effect of the channel transfer function flattening up to twice the Nyquist frequency with the one-half UI delay where a conventional UI can only flatten the channel transfer function up to the Nyquist frequency. FIGS. 8A and 8B show similar results where jitter is dominant in the channel and eye width in particular improves substantially from 30.61% to 47.1% when one-half UI is applied instead of a full UI.

Figure 9:
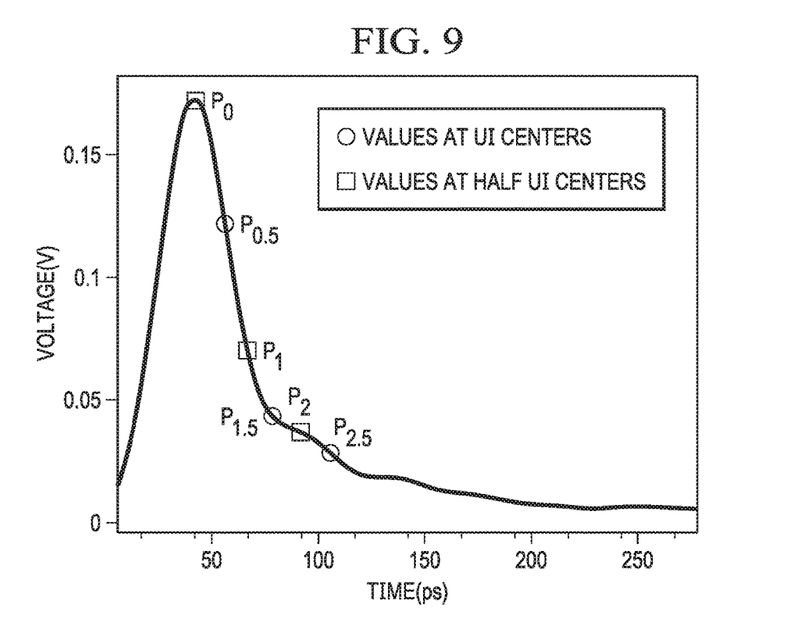
FIG. 9 depicts pulse regions with 2 tap FFE and half-UI FFE.

Referring now to FIG. 9, pulse regions are depicted with 2 tap FFE and half-UI FFE to illustrate the impact of one-half UI FFE on a physical channel. When a pulse is transmitted through a high speed physical channel, the pulse creates a pulse response like that depicted by FIG. 9, which is the transfer function of the channel. Inter-symbol interference (ISI) causes the pulse response to spread out and interfere with other unit intervals of the pulse signal. To provide a simplified example, the pulse response generated for FIG. 9 uses 1-tap FFE with one main cursor and one post tap. In conventional single UI FFE, the points of the pulse response for P1, P2, etc. . . . are taken into account to equalize the signal, where each point is separate by one UI. The pulse response for these points eventually dampen down to a minimal values so that the taps used for equalization become ineffective. In contrast, taking the half UI taps such as at 0.5 and 1.5 UI, more energy is taken into the taps and the taps do not dampen as quickly so that high frequency energy remains available to apply to compensation. By considering the extra pulse samples in each UI, the rise and fall time of equalized output response is improved with the channel transfer function flattened at a frequency greater than the Nyquist frequency for better high frequency loss compensation.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions;
a memory operable to store the instructions and information processed by the instructions;
a communication link interfaced with the processor and memory, the communication link having a transmitter that transmits the information across a physical medium to a receiver;
a clock interfaced with the communication link and referenced by the transmitter to define a unit interval, the information sent as high and low bits held for the unit interval; and
a feed forward equalization module interfaced with the communication link, the feed forward equalization module applying pre-emphasis at a low-bit-to-high-bit transition, the pre-emphasis applied for a fractional portion of the unit interval;
wherein:
the feed forward equalization module further applies de-emphasis at a high-to-low-bit transition, the de-emphasis applied for the fractional portion of the unit interval; and
the fractional portion comprises one-half unit interval.

2. An information handling system comprising:
a processor operable to execute instructions;
a memory operable to store the instructions and information processed by the instructions;
a communication link interfaced with the processor and memory, the communication link having a transmitter that transmits the information across a physical medium to a receiver;
a clock interfaced with the communication link and referenced by the transmitter to define a unit interval, the information sent as high and low bits held for the unit interval; and
a feed forward equalization module interfaced with the communication link, the feed forward equalization module applying pre-emphasis at a low-bit-to-high-bit transition, the pre-emphasis applied for a fractional portion of the unit interval;
wherein:
the feed forward equalization module further applies de-emphasis at a high-to-low-bit transition, the de-emphasis applied for the fractional portion of the unit interval; and
the fractional portion comprises one-quarter unit interval.

3. An information handling system comprising:
a processor operable to execute instructions;
a memory operable to store the instructions and information processed by the instructions;
a communication link interfaced with the processor and memory, the communication link having a transmitter that transmits the information across a physical medium to a receiver;
a clock interfaced with the communication link and referenced by the transmitter to define a unit interval, the information sent as high and low bits held for the unit interval; and a feed forward equalization module interfaced with the communication link, the feed forward equalization module applying pre-emphasis at a low-bit-to-high-bit transition, the pre-emphasis applied for a fractional portion of the unit interval; and an eye utility interfaced with the communication link and operable to evaluate an eye opening at the communication link, the transmitter adjusting the fractional portion of the unit interval to increase the eye opening.

4. An information handling system comprising:

a processor operable to execute instructions;

a memory operable to store the instructions and information processed by the instructions;

a communication link interfaced with the processor and memory, the communication link having a transmitter that transmits the information across a physical medium to a receiver;

a clock interfaced with the communication link and referenced by the transmitter to define a unit interval, the information sent as high and low bits held for the unit interval; and a feed forward equalization module interfaced with the communication link, the feed forward equalization module applying pre-emphasis at a low-bit-to-high-bit transition, the pre-emphasis applied for a fractional portion of the unit interval;

wherein the feed forward equalization module further adjusts the fractional portion of the unit interval to reduce bit error associated with information sent across the communication link.

5. A method for communicating information across a physical link, the method comprising:

sending the information from a transmitter as bits across the physical link, each bit having a high or low value held for a unit interval;

receiving the bits at a receiver interfaced with the physical link, the receiver determining the information from the high and low bit values; and pre-emphasizing at least some of the bits associated with a transition from the low to the high value, the pre-emphasizing applied for a fraction of the unit interval not greater than one-half the unit interval.

6. The method of claim 5 further comprising:

de-emphasizing at least some of the bits associated with a transition from the high to the low value, the de-emphasizing applied for a fraction of the unit interval not greater than one-half the unit interval.

7. The method of claim 6 further comprising:

applying the pre-emphasizing and the de-emphasizing for the same fraction of the unit interval.

8. The method of claim 6 further comprising:

applying the pre-emphasizing and de-emphasizing for different fractions of the unit interval.

9. The method of claim 5 wherein the fraction of the unit interval is one-half the unit interval.

10. The method of claim 5 wherein the fraction of the unit interval is one-quarter the unit interval.

11. The method of claim 5 wherein the physical link comprises a PCIe communication link.

12. The method of claim 5 further comprising:

monitoring an eye opening associated with a signal communicated across the physical link; and adjusting the fraction of the unit interval to increase the eye opening height provided through the monitoring.

13. A system for communicating information across a physical link, the system comprising:

a transmitter operable to communicate information as high or low values across a physical link, each bit of information held as a high or low signal for a unit interval; and a feed forward equalization module interfaced with the transmitter and operable to apply pre-emphasis to at least some bits of information at a transition from the low to high signal, the pre-emphasis applied for one-half of a unit interval.

14. The system of claim 13 wherein the pre-emphasis is substantially twenty percent of the high value.

15. The system of claim 13 wherein the signal ramps downward in a graduated manner from the pre-emphasis value to the high value at the one-half unit interval through the unit interval.

16. The system of claim 15 wherein the feed forward equalization module is further operable to apply a de-emphasis to at least some bits of information at a transition from the high to the low signal, the de-emphasis applied for one-half of a unit interval.

* * * * *